Figure 1:
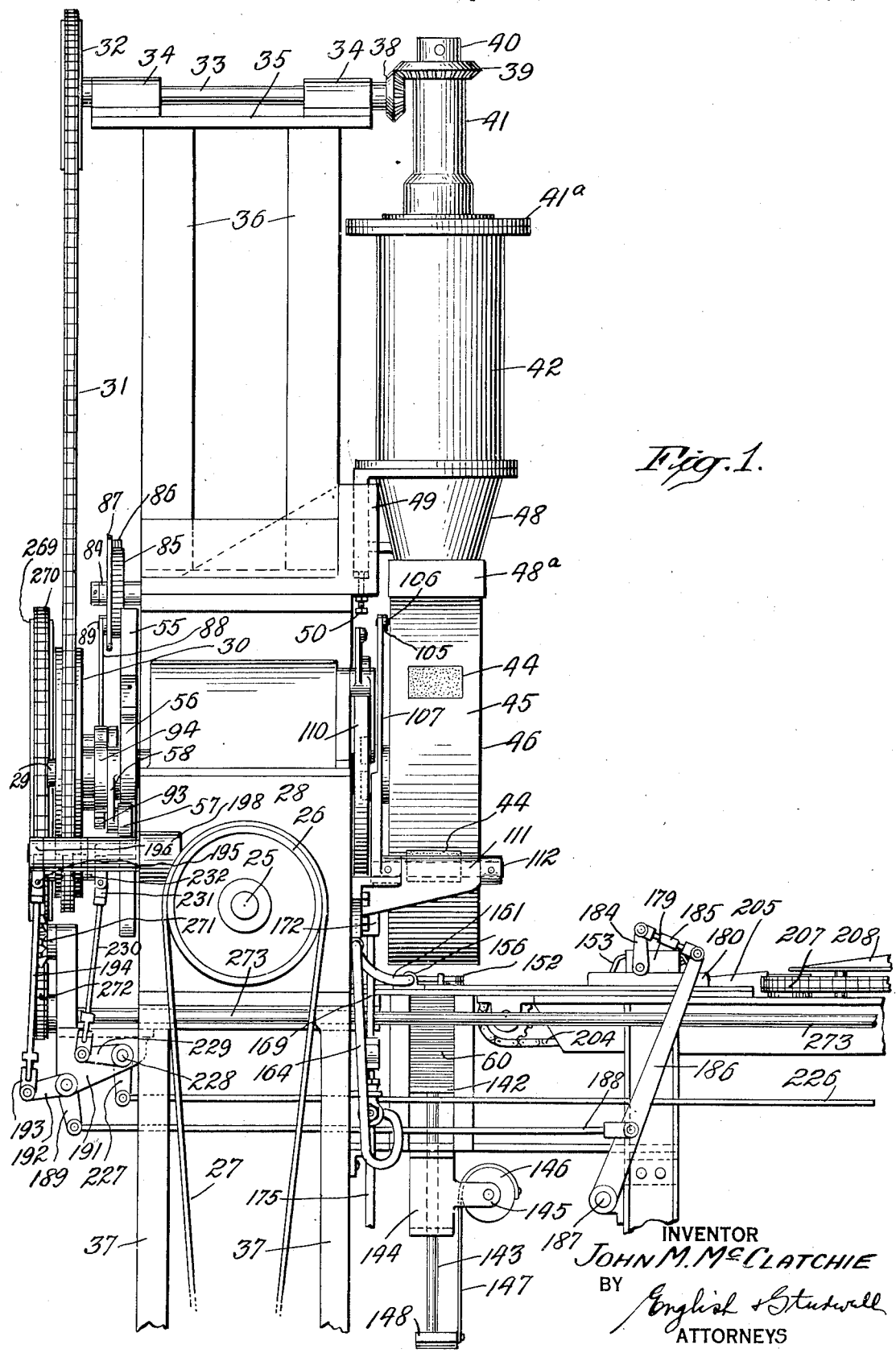

Aug. 6, 1935.　　　　J. M. McCLATCHIE　　　2,010,523
MACHINE FOR PACKAGING PLASTIC MATERIAL
Filed Sept. 23, 1932　　12 Sheets-Sheet 1

INVENTOR
John M. McClatchie
BY English & Studwell
ATTORNEYS

Aug. 6, 1935.  J. M. McCLATCHIE  2,010,523
MACHINE FOR PACKAGING PLASTIC MATERIAL
Filed Sept. 23, 1932   12 Sheets-Sheet 4

INVENTOR
JOHN M. McCLATCHIE
BY English + Studwell
ATTORNEYS

Aug. 6, 1935.  J. M. McCLATCHIE  2,010,523
MACHINE FOR PACKAGING PLASTIC MATERIAL
Filed Sept. 23, 1932   12 Sheets-Sheet 5
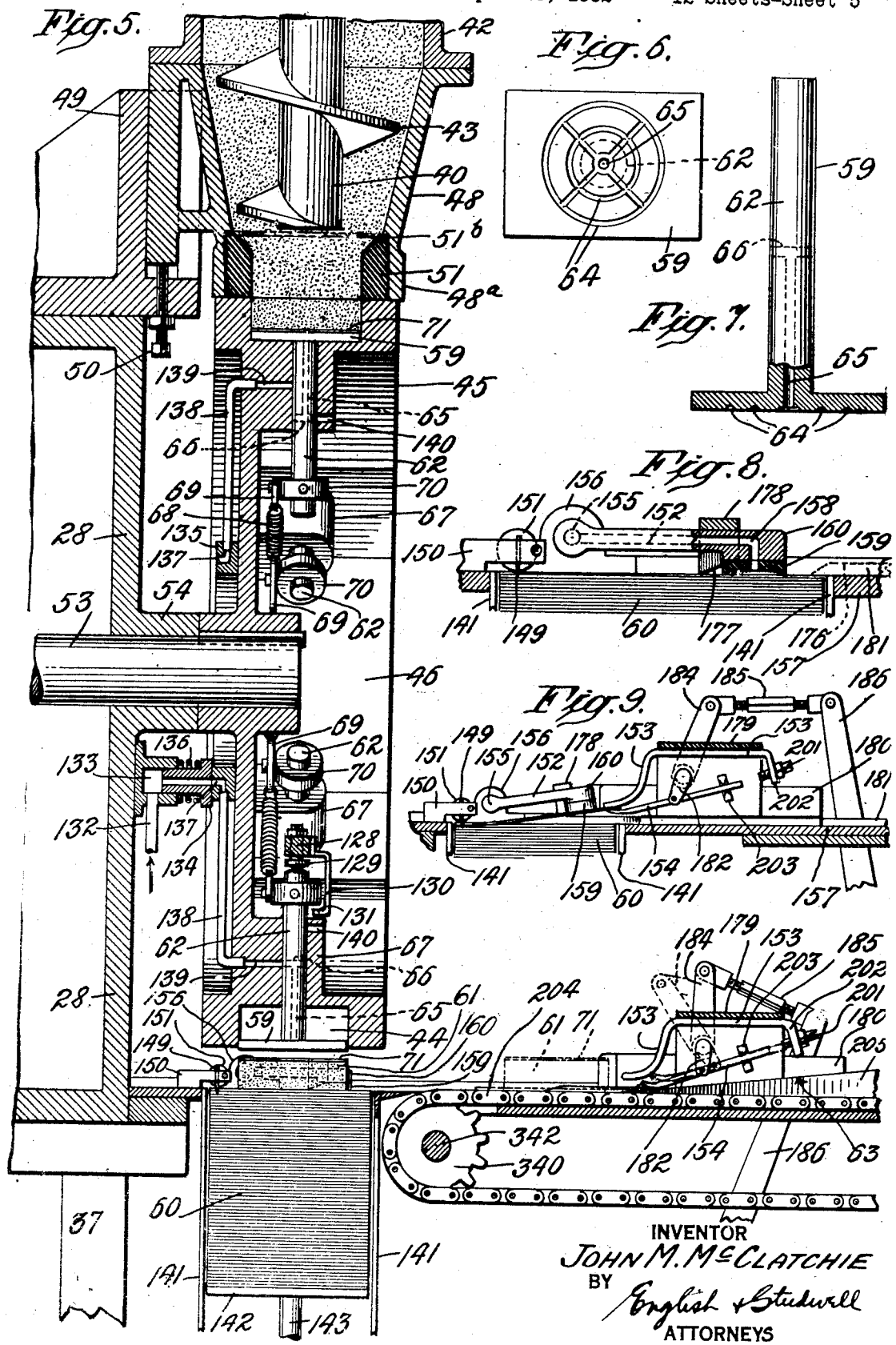
INVENTOR
JOHN M. McCLATCHIE
BY
English & Studwell
ATTORNEYS Aug. 6, 1935.   J. M. McCLATCHIE   2,010,523
MACHINE FOR PACKAGING PLASTIC MATERIAL
Filed Sept. 23, 1932   12 Sheets-Sheet 6

INVENTOR
JOHN M. McCLATCHIE
BY English + Studwell
ATTORNEYS

Aug. 6, 1935.  J. M. McCLATCHIE  2,010,523
MACHINE FOR PACKAGING PLASTIC MATERIAL
Filed Sept. 23, 1932  12 Sheets-Sheet 7
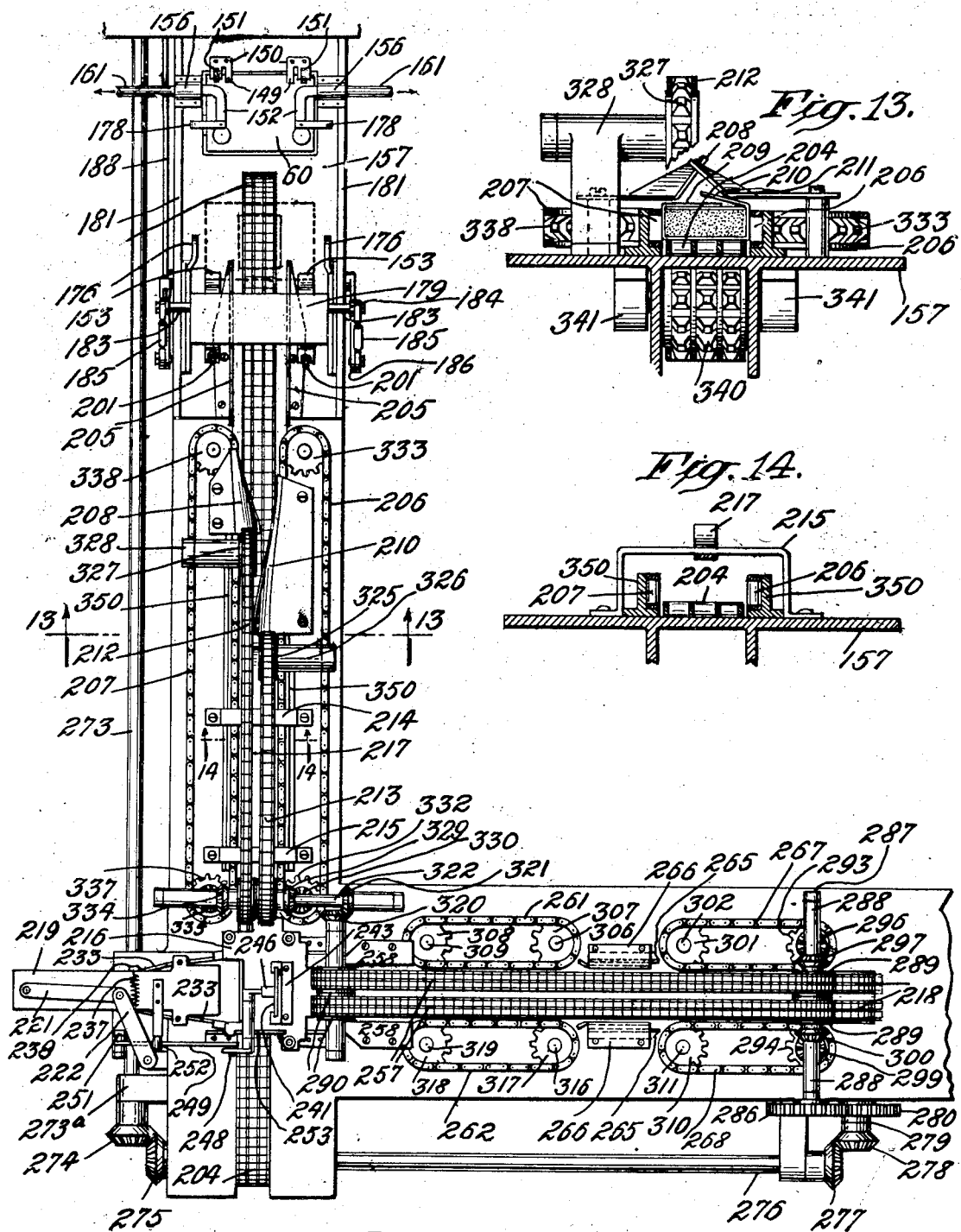
INVENTOR
JOHN M. McCLATCHIE
BY
English Stadwell
ATTORNEYS

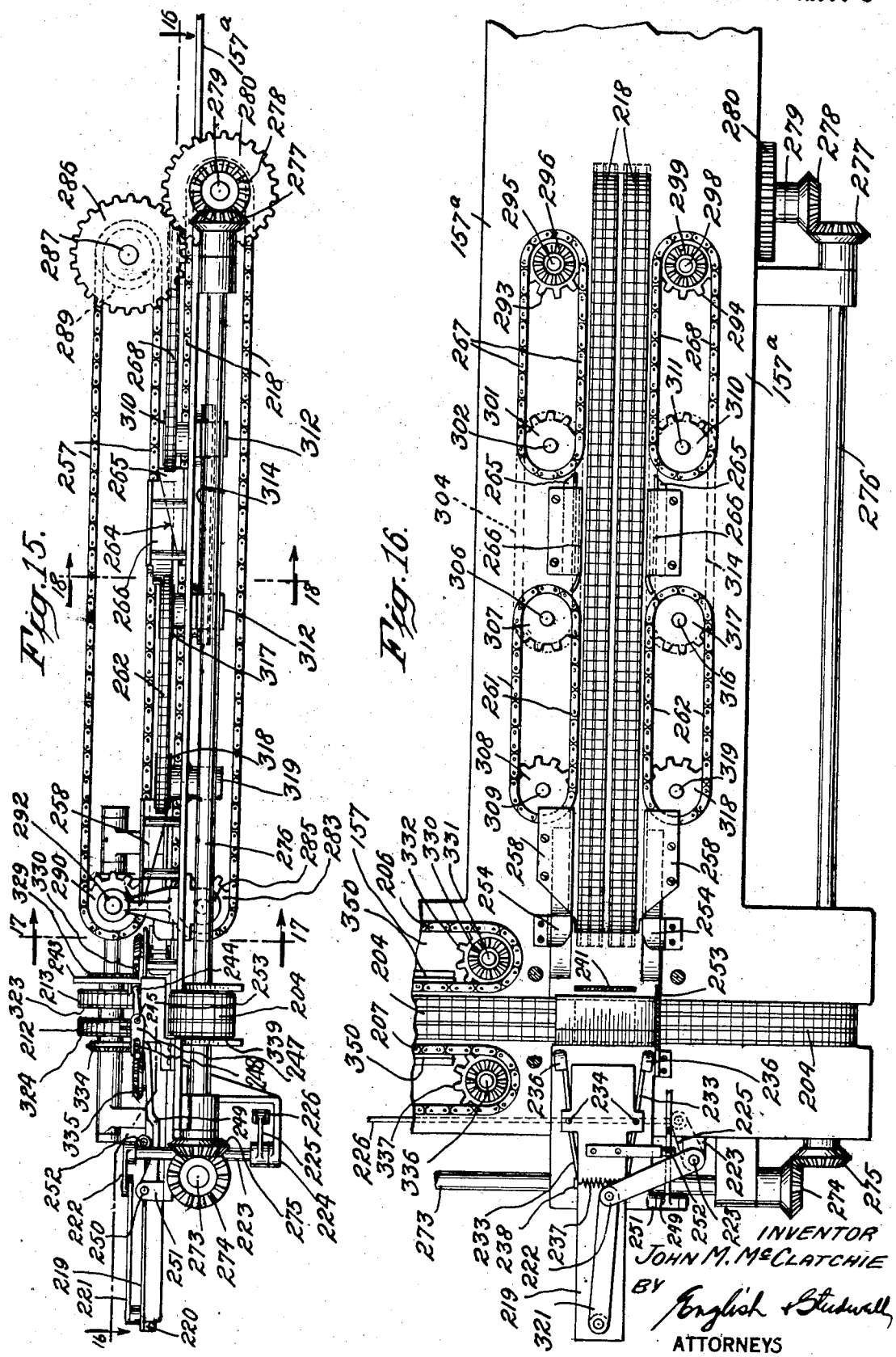

Aug. 6, 1935. J. M. McCLATCHIE 2,010,523
MACHINE FOR PACKAGING PLASTIC MATERIAL
Filed Sept. 23, 1932 12 Sheets-Sheet 9

INVENTOR
JOHN M. McCLATCHIE
BY
English & Stirwell
ATTORNEYS

Aug. 6, 1935.                J. M. McCLATCHIE                2,010,523
              MACHINE FOR PACKAGING PLASTIC MATERIAL
                  Filed Sept. 23, 1932    12 Sheets-Sheet 10
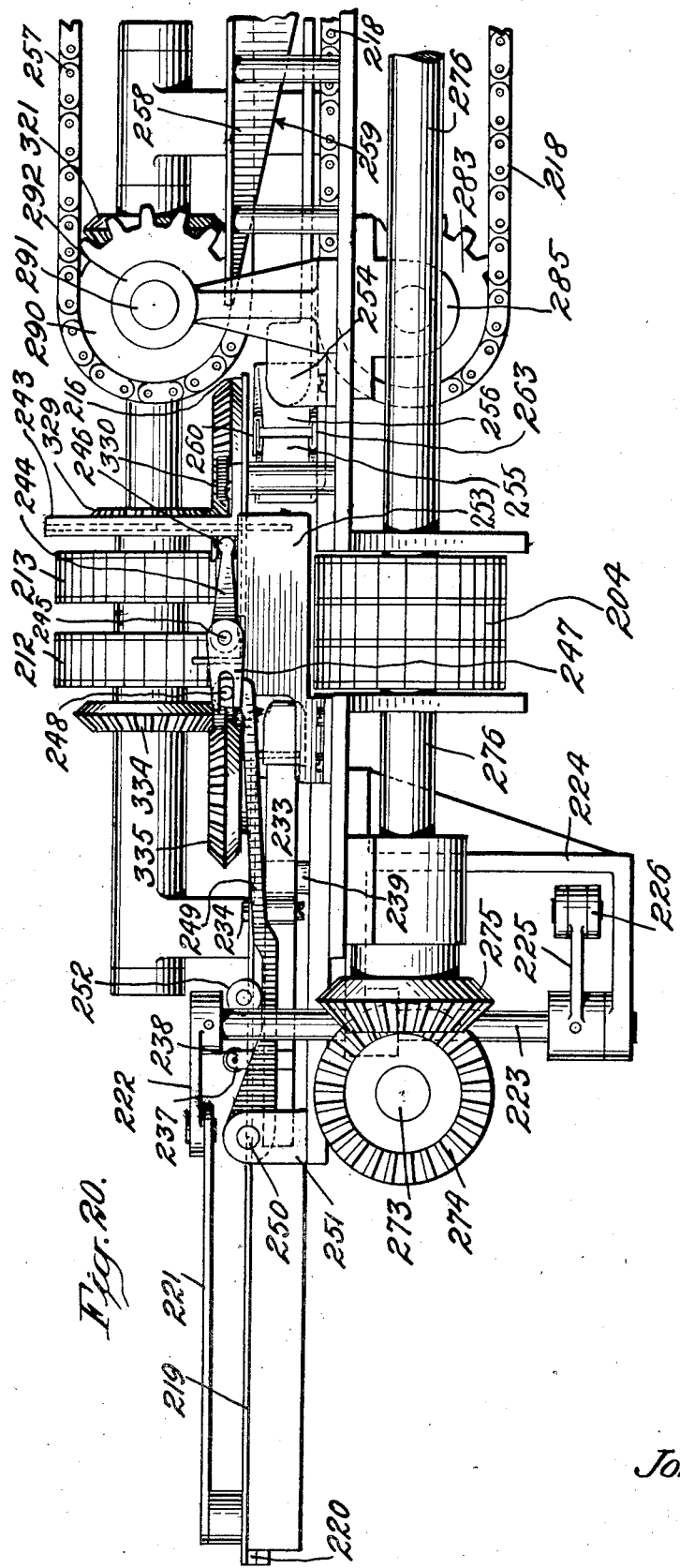
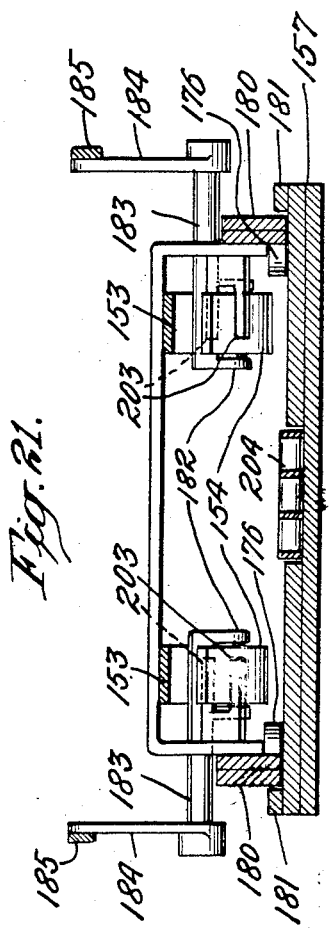
INVENTOR
JOHN M. McCLATCHIE
BY
English & Studwell
ATTORNEYS

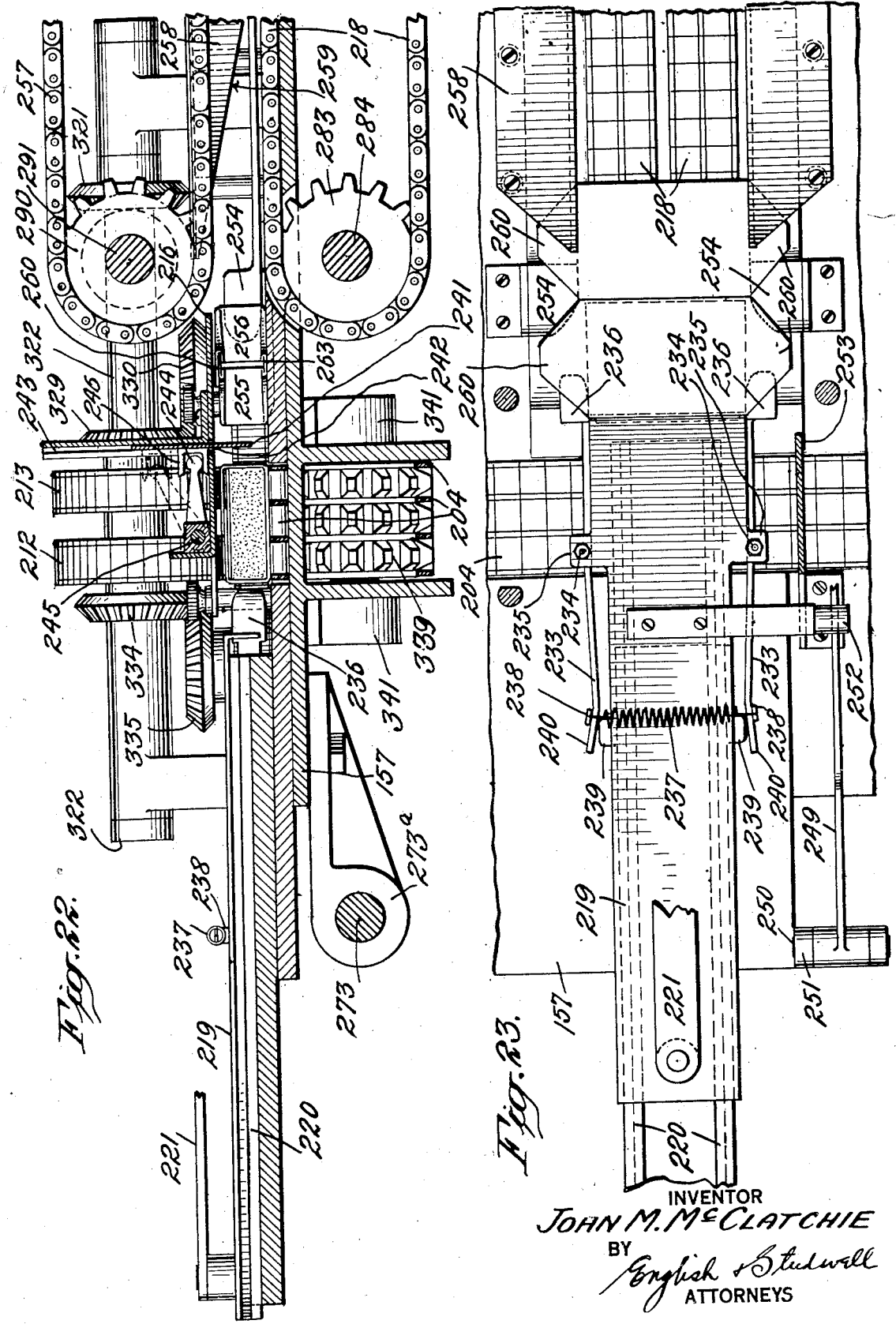

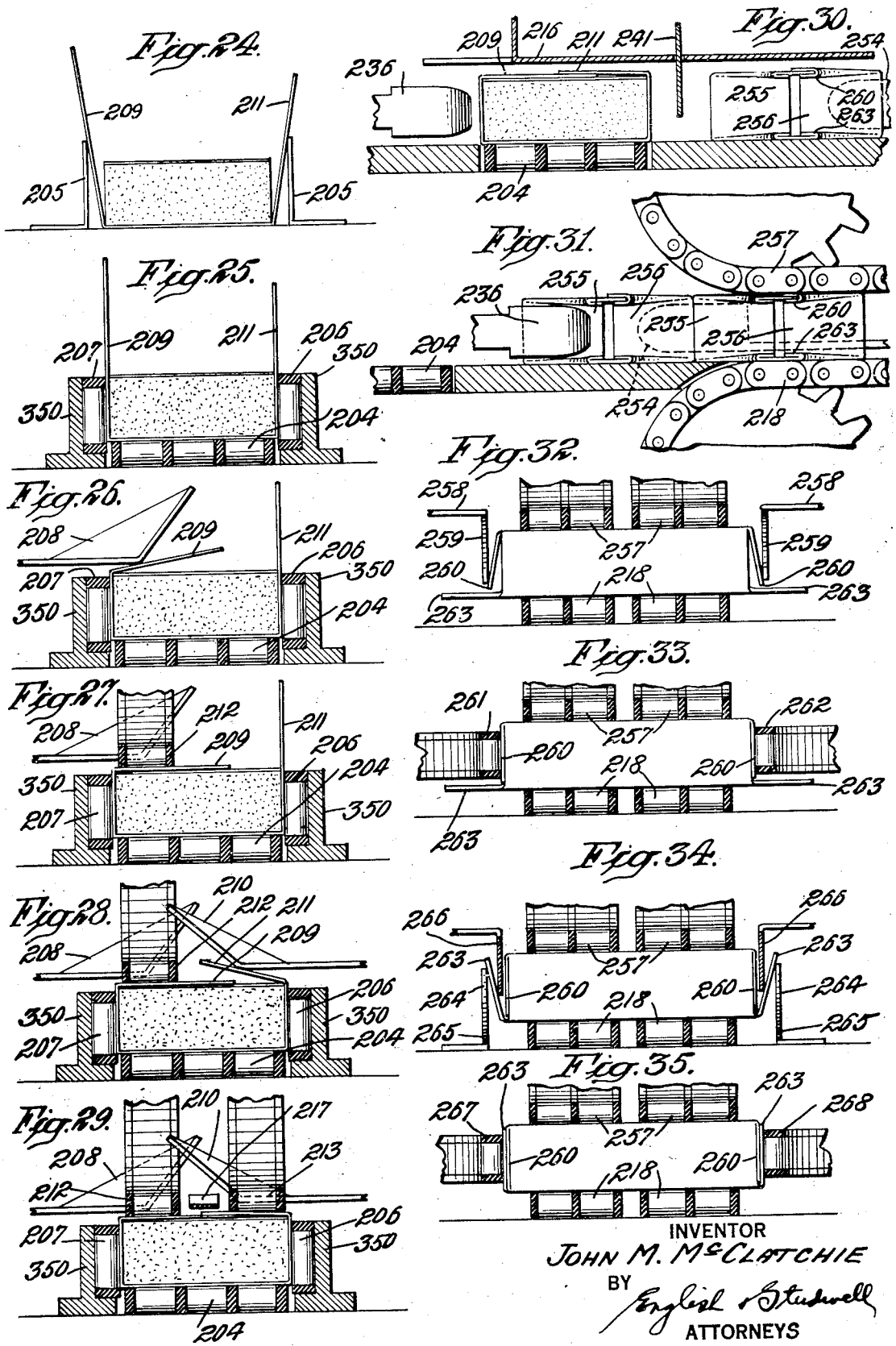

Patented Aug. 6, 1935

2,010,523

UNITED STATES PATENT OFFICE 2,010,523

MACHINE FOR PACKAGING PLASTIC MATERIAL

John M. McClatchie, New York, N. Y., assignor to The Borden Company, New York, N. Y., a corporation of New Jersey Application September 23, 1932, Serial No. 634,521

23 Claims. (Cl. 93—4)

This invention relates to an apparatus for wrapping or enclosing in paper, foil or other material, previously formed cakes of relatively soft or plastic materials, such as cream cheese and other soft cheeses, mince meat, or the like. The nature of the material to be formed into cakes which are thereafter wrapped, is such that the usual types of wrapping machines can not be satisfactorily used for the purpose of wrapping these cakes. The nature of cream cheese or other relatively soft cheese and other products of like consistency is such that the formed cakes tend to collapse, crush or break apart readily under the application of such pressure as is normally imposed by wrapping machines as heretofore constructed.

The primary object of the present invention is to provide an apparatus operating entirely automatically for forming cakes from a mass of plastic material, and wrapping such cakes, the wrapped cakes when delivered from the apparatus being ready for packing in cartons and shipment.

A further object of the invention is to provide novel means for automatically forming cream cheese or other materials of like consistency and plasticity into cakes, and automatically delivering the cakes and a wrapper to wrapping means which fold the wrapper about the cake while carrying the cake to the delivery end of the machine.

A still further object of the invention is to provide a novel wrapping means wherein the cakes of cheese are wrapped while being carried on a conveyor, with the folded portions of the wrapper first brought up against the cake of cheese and then held in position about it by moving chains without applying crushing pressure on the cakes.

Another object of the invention is to provide a wrapping mechanism for cakes of cheese and like materials, which, in addition to applying a wrapper, also applies a protective paper sheet against one face of the cake beneath the wrapper, the sheet so applied serving to prevent the admission of air between the overlapped flap portions of the wrapper so that oxidation of the cheese is thereby prevented.

The apparatus of the invention is provided with an intermittently rotated drum which is formed with mold recesses to receive cheese or other soft material from a hopper and form it into cakes and then deliver the cakes of cheese successively on the uppermost wrapper in a wrapper stack. The cake and the uppermost wrapper of the stack is then delivered to a chain conveyor on which the wrapper is wrapped longitudinally about the cake, the cake and partly applied wrapper being then carried by the conveyor to a junction where it is moved at right angles to its former direction of movement and where the ends of the wrapper are infolded about the cake to complete the wrapping operation. The conveying means employed for transporting the cakes of cheese consist of wide, flat chains or belts upon which the cakes of cheese are held by their own weight. Additional chains or belts, moving in the same direction as the conveyor chains, are brought into contact with the top, sides and ends of the cake of cheese after the various parts of the wrapper are partly folded over the cake, these chains acting to complete the folding of the wrapper by bringing the parts of the wrapper smoothly in position about the cake of cheese without distorting or crushing the cheese.

For the purpose of simplicity in description the substance which is molded and wrapped by the improved apparatus and process, is herein referred to as "cheese", it being understood, however, that the mechanism and method herein described are applicable for use in connection with the molding and shaping of almost any other soft, plastic substance difficult, if not impossible, to mold and wrap by structures in general use at the present time for wrapping materials of a different nature.

Figure 2:
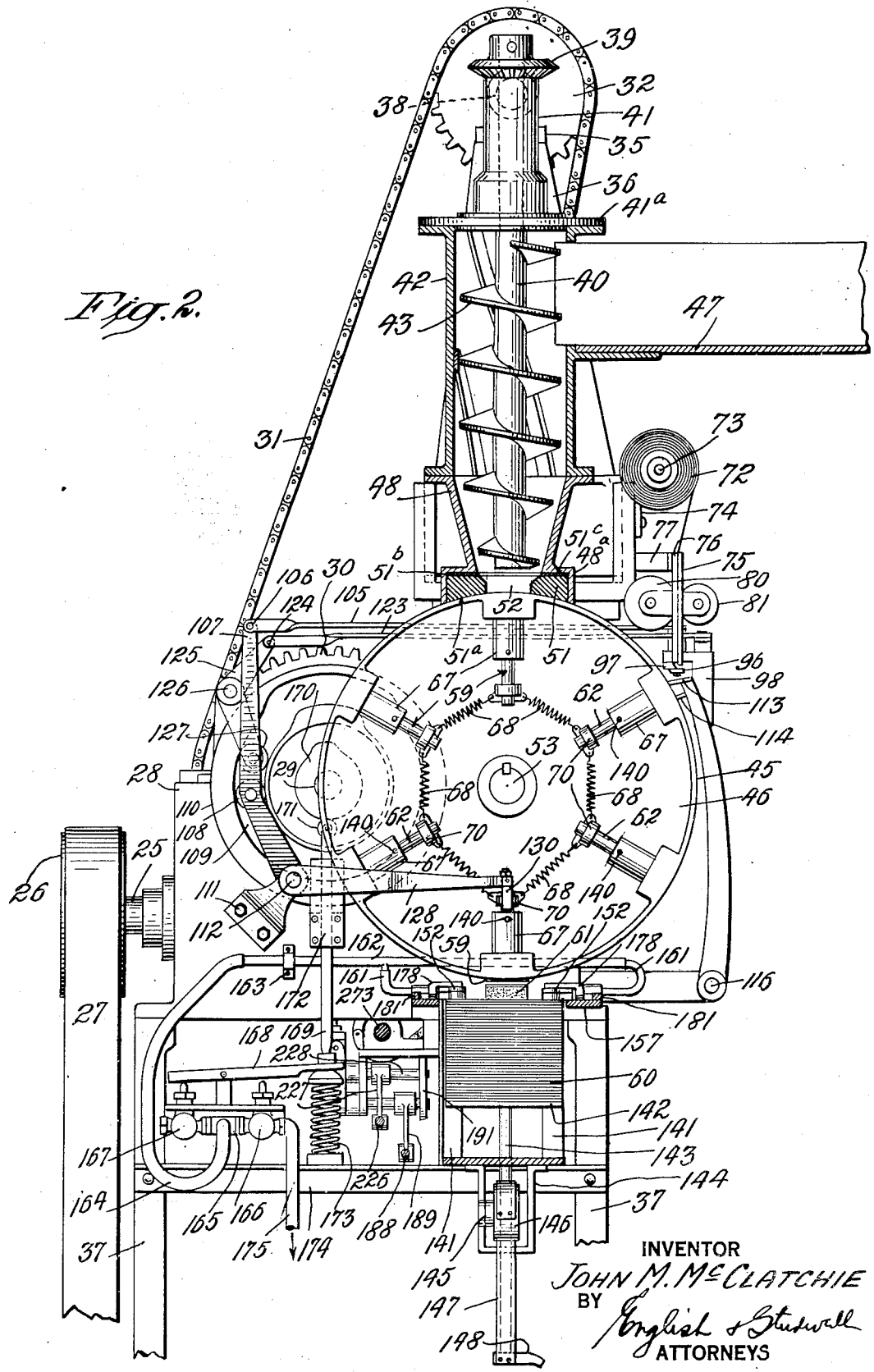
Figure 3:
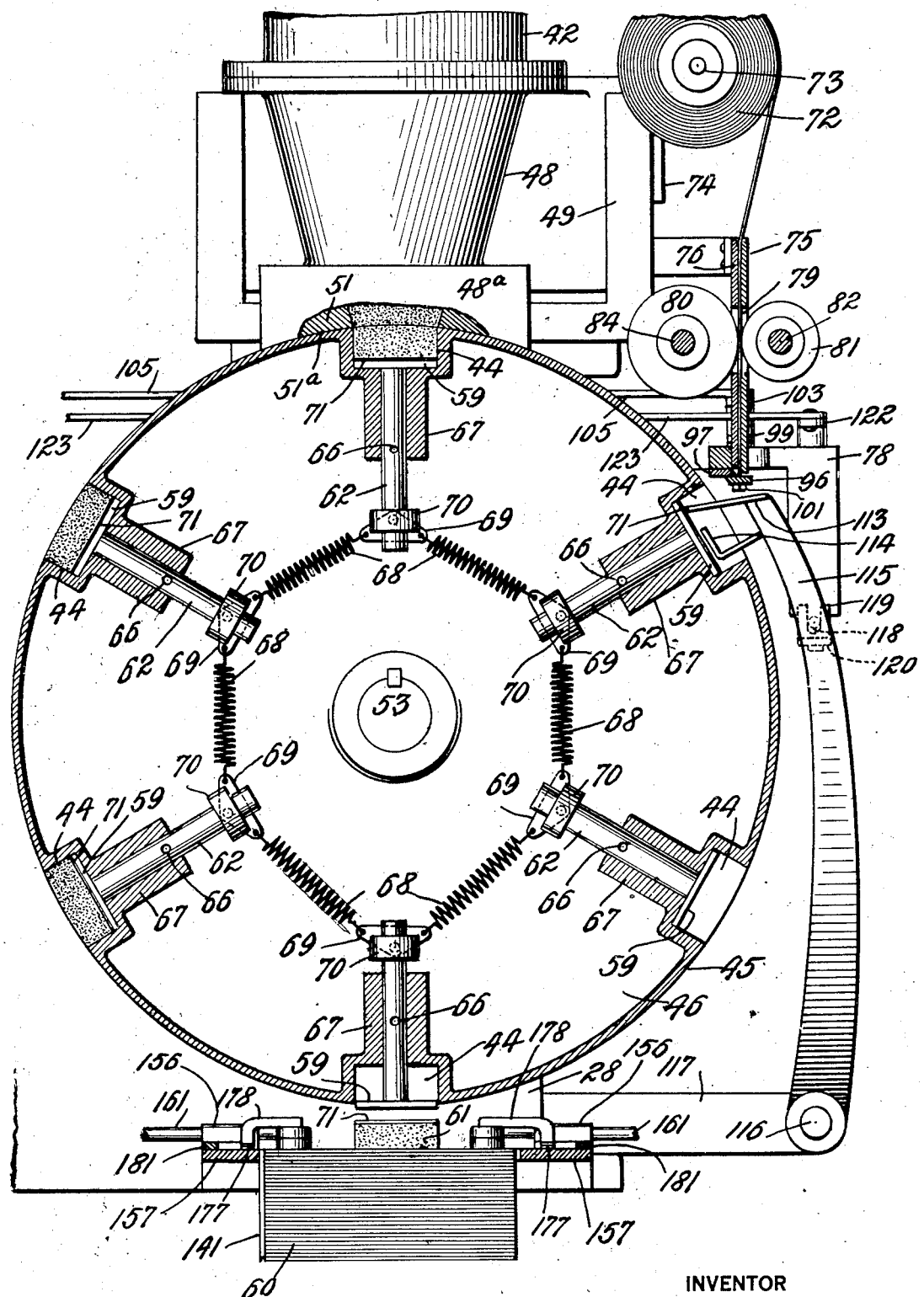
Figure 4:
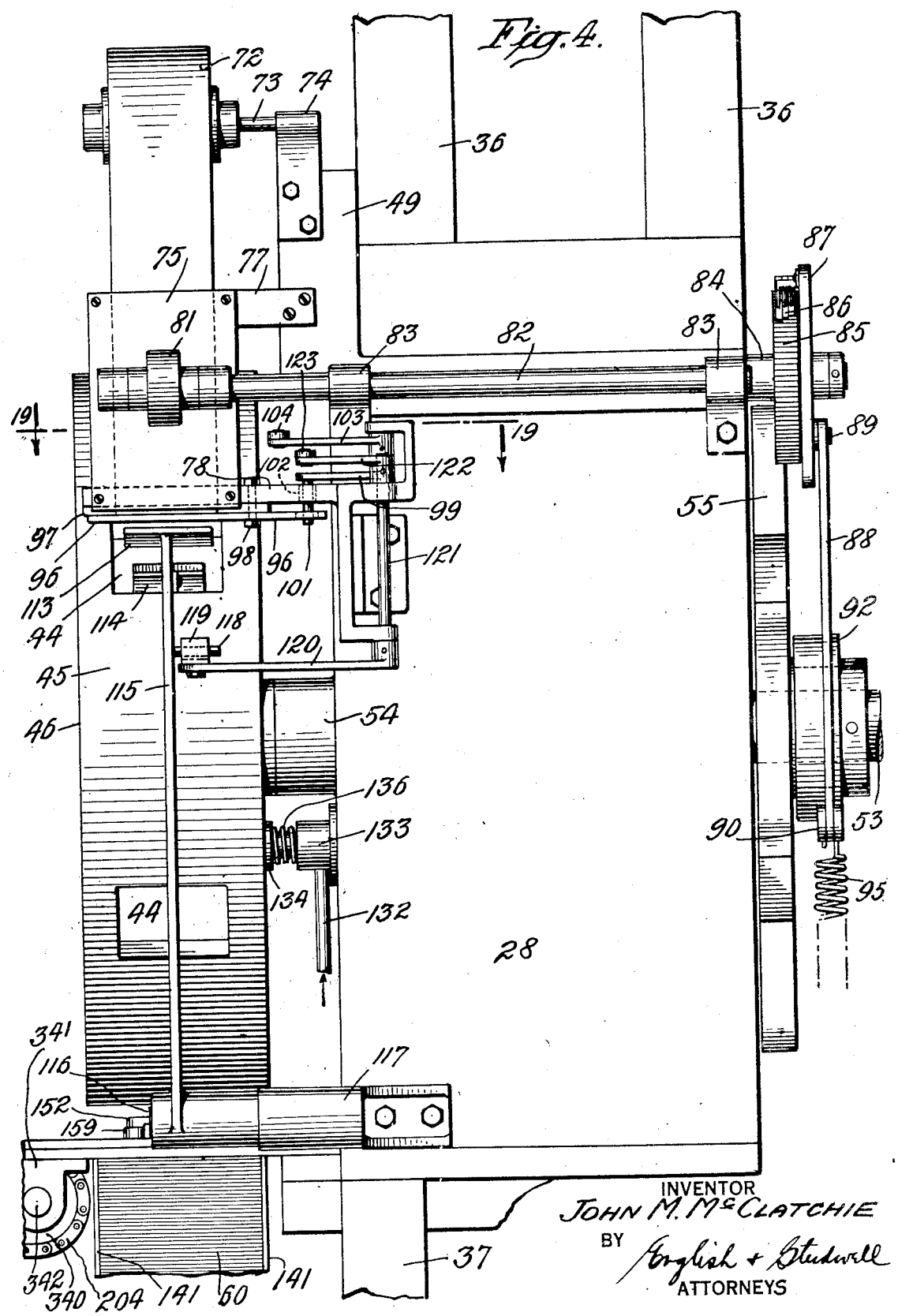
Figure 10:
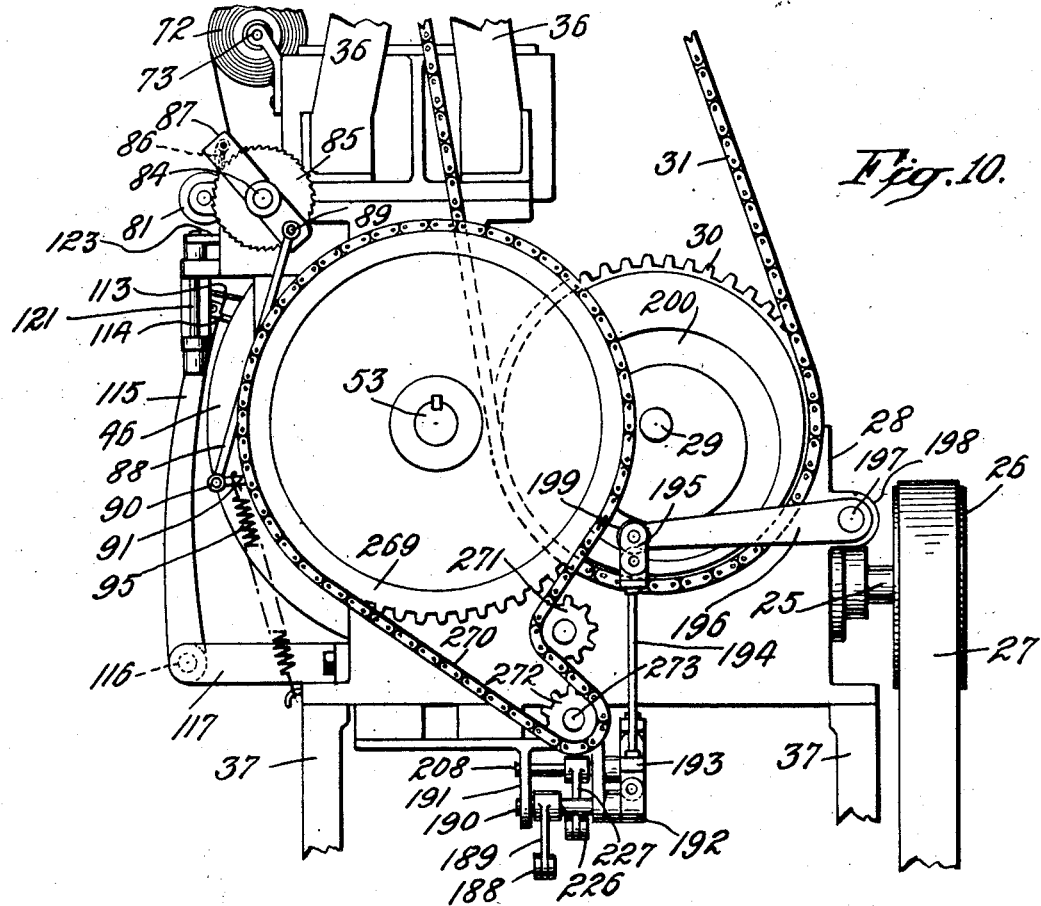
Figure 11:
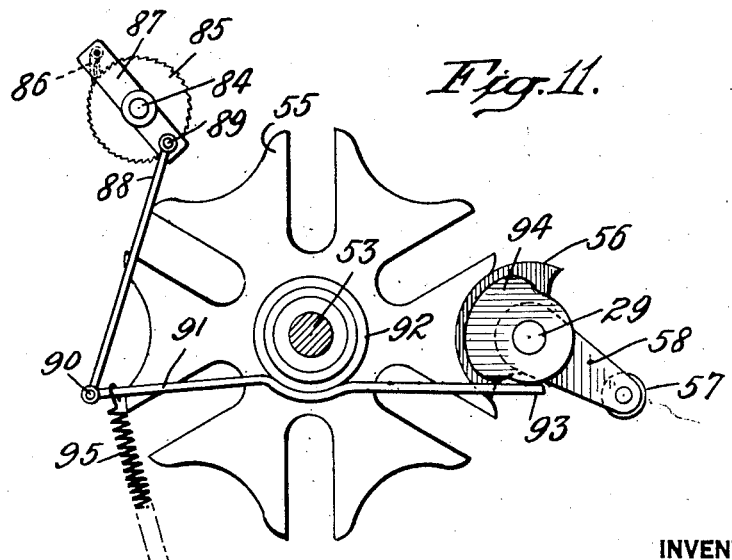
Figure 17:
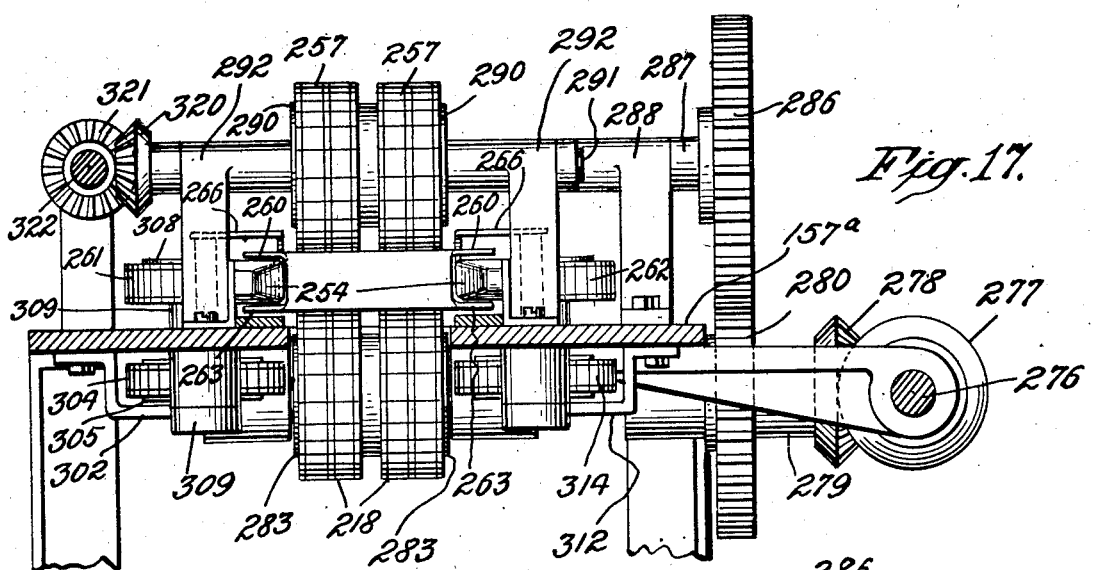
Figure 18:
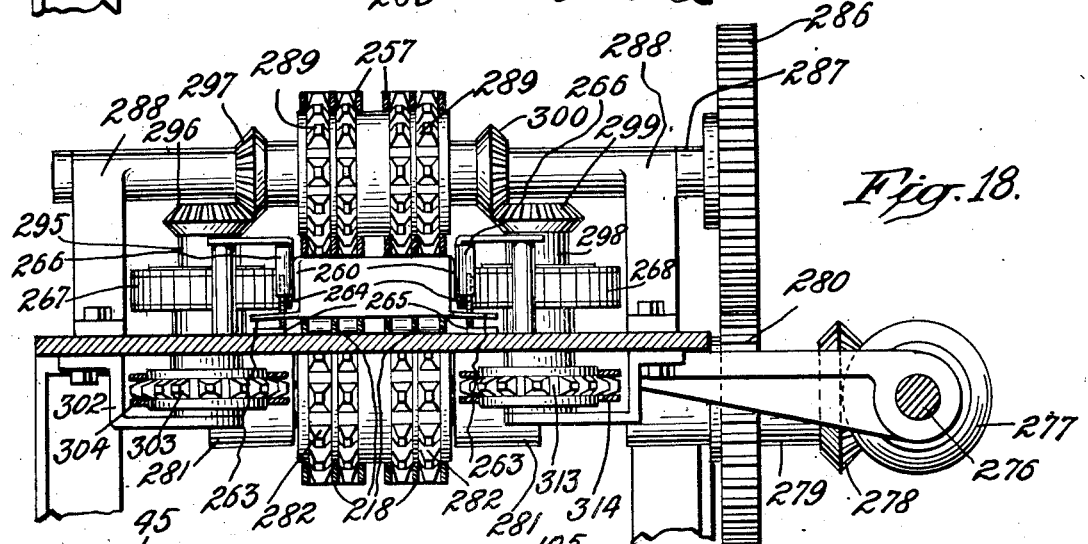
Figure 19:
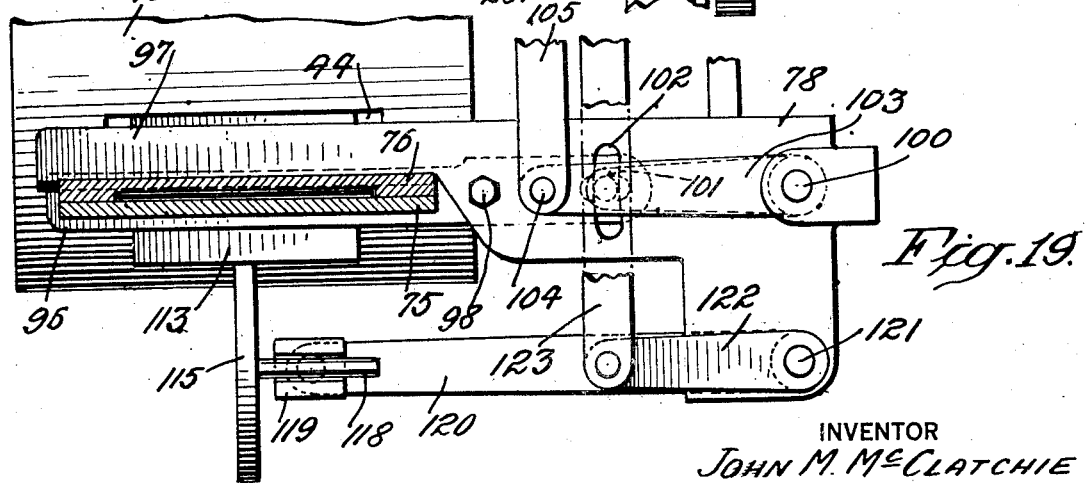

In the accompanying drawings, wherein the preferred embodiment of the invention is shown, Fig. 1 is a side elevation of the mechanism for molding the cheese into cakes and delivering the cakes to the wrapper stack from whence each cake of cheese and wrapper is moved to the wrapping mechanism.; Fig. 2 is a view of the molding mechanism taken at right angles to Fig. 1; Fig. 3 is a vertical sectional view through the rotating mold drum and associated parts; Fig. 4 is a side elevation of the mechanism shown in Fig. 3, looking from the right of Fig. 3; Fig. 5 is a vertical sectional view through the mold drum and associated parts, taken at right angles to Fig. 3; Fig. 6 is a view of the channelled under face of one of the plungers which ejects the cakes of cheese from the mold recesses; Fig. 7 is a side elevation of the plunger shown in Fig. 6, with the head of the plunger shown in section; Fig. 8 is a side elevation, partly in section, of the pneumatic picker for elevating the uppermost of the wrappers from the wrapper stack; Fig. 9 is a view of the pneumatic picker and wrapper-delivery means showing a wrapper being gripped by the delivery means preparatory to being transported thereby to the chain conveyor; Fig. 10 is a rear view of a part of the machine, showing the driving mechanism; Fig. 11 is a view of the Geneva gear movement for intermittently rotating the mold drum, showing also the mechanism for intermittently feeding the paper lining that is cut into sheets and inserted in the mold recesses;

Fig. 12 is a plan view of the conveying means, showing the mechanism for wrapping each cake of cheese; Fig. 13 is a sectional view on the line 13—13 of Fig. 12, looking in the direction of the arrows; Fig. 14 is a sectional view on the line 14—14 of Fig. 12, looking in the direction of the arrows; Fig. 15 is a front elevation of the structure shown in Fig. 12; Fig. 16 is a horizontal sectional view on the line 16—16 of Fig. 15, looking in the direction of the arrows; Fig. 17 is a sectional view on the line 17—17 of Fig. 15, looking in the direction of the arrows; Fig. 18 is a sectional view on the line 18—18 of Fig. 15, looking in the direction of the arrows; Fig. 19 is a sectional view on the line 19—19 of Fig. 4, looking in the direction of the arrows; Fig. 20 is an elevation of the wrapping mechanism at the point therein where the ends of the applied wrappers are about to be infolded against the ends of the cakes of cheese; Fig. 21 is a transverse sectional view through the wrapper-transporting mechanism shown in Fig. 9; Fig. 22 is a longitudinal sectional view through the mechanism shown in Fig. 20; Fig. 23 is a plan view, with the upper chains omitted, of the structure shown in Fig. 22; Figs. 24 to 29 inclusive are transverse sectional views through the mechanism which folds the longitudinal flaps of the wrapper, illustrating how these flaps are folded about the cake of cheese; Figs. 30 and 31 are longitudinal sectional views through parts of the wrapping mechanism, showing the partly wrapped cakes of cheese being shifted from the mechanism which folds the longitudinal flaps, to the mechanism which folds the ends of the wrapper about the cake; and Figs. 32 to 35 inclusive are transverse sectional views through the mechanism which folds the ends of the wrapper inwardly against the cake to complete the wrapping operation.

In the operation of the machine, cheese or other soft material is fed from a hopper into molds which form the cheese into the cakes to be wrapped. The hopper into which the cheese is received is shown at 42. Within the hopper is located a spiral vane 43 which is rotated to direct the cheese downwardly and into mold recesses 44 provided in the peripheral flange 45 of a drum 46 which is intermittently rotated.

The drive shaft from which the feeding vane 43 and other mechanism is driven is indicated at 25, a pulley 26 being secured thereon and driven by a belt 27 extending from a motor or other suitable source of power. The shaft 25 drives reducing gearing, not shown in detail, since it is of conventional arrangement, but contained within the casing 28 supported on the frame standards 37 and clearly shown in Figs. 1, 2, and 10. A shaft 29 is continuously driven from the reducing gearing contained in the casing 28, the shaft 29 carrying a sprocket 30 driving a chain 31 extending upwardly and about a sprocket 32 secured at the end of a shaft 33 mounted in bearings 34 supported on a plate 35 located at the upper end of uprights 36 forming a part of the frame of the machine. At the opposite end of the shaft 33 is secured a bevel gear 38 which meshes with and drives a bevel gear 39 secured at the upper end of a vertical shaft 40 on which the vane 43 is located. The shaft 40 is rotatably mounted in a bearing 41 supported on a plate 41a and extending downwardly within the hopper 42.

The cheese or other material to be molded and wrapped is delivered in bulk from a table or other like support 47 into the hopper 42 where it is directed downwardly and into the mold recesses 44 by the spiral feeding member or vane 43 during pauses in the intermittent rotation of the drum 46.

At its lower end, the hopper 42 is provided with a contracted or conical portion 48 supported in a bracket 49 on the casing 28, and in which the portion 48 is vertically adjustable by means of the screws 50. At the lower end of the conical portion 48 of the hopper is a chamber 48a in which is located a member or block 51 having a central opening 52 adapted to align with each of the mold recesses 44 in the drum 46 to permit the accurate direction of the cheese into them.

The member 51 is preferably made of soft metal, such as block tin, and has its lower curved face 51a (Fig. 3) resiliently held against the face of the peripheral flange 45 by the pressure of a rubber washer 51b (Fig. 2) located between the shoulder 51c of the chamber 48a and the upper face of the member 51. Through this arrangement, the under curved face 51a of the member 51 is held in constant close contact with face of the peripheral flange 45 of the drum and the possibility of cheese from the hopper getting between the member 51 and the periphery of the drum is prevented.

The drum 46 is secured upon a shaft 53 rotatably mounted in bearings 54 extending from the casing 28. The shaft 53 is intermittently driven by means of a Geneva gear movement of which the slot-wheel 55 is shown in detail in Fig. 11. The wheel 55 is so shaped and slotted that the drum 46 will, during each pause in its rotative movement, align one of the mold recesses 44 with the opening 52 in the member 51 to receive cheese from the hopper. The wheel 55 is driven by the shaft 29 carrying a cam 56 and projecting arm 58 which carries a roller 57, the cam and roller cooperating with the wheel 55 in the manner well understood to drive it intermittently and impart an intermittent motion to the shaft 53.

Mounted for reciprocating movement in each of the mold recesses 44 is a plunger 59 (Fig. 7). The purpose of these plungers is to eject the cakes of cheese from the molds 44 so that the cakes as ejected are successively deposited upon the top wrapper in a stack indicated at 60. A cake of cheese so deposited on the uppermost wrapper in the stack, is indicated at 61 in Figs. 2, 3, and 5. The construction of each of the plungers 59 is shown in detail in Figs. 6 and 7 where it will be seen that it comprises a stem 62 provided with an integral or attached head or plate member. The head of the plunger is so shaped that it closely fits the interior of one of the mold recesses 44. The head has its operative face formed with air channels 64 connecting with an axial air passage 65 extending through the stem 62 for a part of its length, the end of the passage 65 joining a transverse port 66 extending through the stem.

Each of the plungers 59 is mounted for reciprocation in a boss 67 formed on the drum 46. The plungers 59 are normally held in retracted position in the mold recesses, as shown in Fig. 3 (where all of the plungers except the lowermost one are shown in their retracted position), by means of the springs 68, which extend between and attach to plates 69 pivoted on collars 70, one of which is secured to each plunger stem 62.

The drum 46 is intermittently rotated in a counter-clockwise direction, when viewed as in Figs. 2 and 3, and before each mold recess 44 is brought into position in registration with the hopper outlet for filling, a paper lining or sheet 71 is inserted in each mold recess and brought to rest against the face of the plate or head of the plunger located therein, one of the functions of this sheet being to prevent the cheese from contacting with and sticking to the face of the plunger. These paper sheets or linings 71 are successively cut from a roll 72 and are inserted into each mold when the same is located beneath the roll 72 during pauses in the intermittent rotary movement of the drum 46.

The roll of paper 72 is mounted on a stud 73 secured in a lug 74 attached to and projecting from the bracket 49. Paper drawn from the roll 72 extends downwardly between a pair of guide plates 75, 76 supported by brackets 77 and 78, the plates being apertured at 79 to permit feeding rolls 80 and 81 to engage the paper between them and move it downwardly with an intermittent movement. The roll 81 is an idle roll and is supported on a shaft 82 mounted in the bearings 83. Roll 80 cooperating with the roll 81 to feed the paper, is driven with an intermittent motion by means of the mechanism shown in Fig. 11. The roll 80 is secured on the end of shaft 84, and attached on the shaft adjacent its opposite end is a ratchet wheel 85 engaged and rotated by pawls 86 carried by the oscillating arm 87 loosely mounted on shaft 84. The required oscillating movement is imparted to the arm 87 by means of a link 88 having one of its ends connected at 89 to one end of the arm 87 and its opposite end connected at 90 to a lever 91 which is attached to a collar 92 loosely mounted on the shaft 53. The free end 93 of the lever 91 is operated upon by a cam 94 secured on the shaft 29. Oscillating or rocking movements imparted to the lever 93 by the cam 94 are communicated to the arm 87 by the link 88, causing the pawls 86 to turn the ratchet wheel and thus rotate the roller 80 for a required distance so that it, in cooperation with the roller 81 feeds a section of paper of required length downward between the guide-plates 75 and 76 in timed relation with the intermittent rotation of the drum 46. A spring 95 holds the end 93 of the lever 91 in contact with the cam 94.

The paper fed from the roll 72 after passing between the guide plates 75 and 76, is severed into lengths to form the sheets 71 by means of a cutting device composed of two blades 96 and 97. In Fig. 19 the cutting device is shown in enlarged detail. The blade 97 is fixed to or forms a part of the supporting bracket 78, the blade 96 being pivoted at 98 on the bracket 78 and having a shearing movement relative to the fixed blade 97 so that it cooperates therewith to sever the paper strip passed between the blades. A shearing movement is imparted to the blade 96 by means of an arm 99 (Fig. 4) pivoted at 100 (Fig. 19) in the bracket 78. At its free end the arm 99 is provided with a pin 101 which extends downwardly through a transverse arcuate slot 102 formed in the bracket 78 and is loosely received in an axial slot in the end of the movable cutting blade 96. An arm 103 mounted on the pivot pin 100 is connected to the hub of the arm 99 so that an oscillatory movement of the arm 103 will likewise oscillate the blade-operating arm 99. The free end of the arm 103 is connected to one end of a link 105 the other end of which is connected at 106 to the upper end of a cam lever 107 carrying a cam roll 108 movable in a cam groove 109 formed in a cam 110 secured on the continuously driven shaft 29. The cam lever 107 is fixed to a pivot pin 112 journaled in a bracket 111 secured to the casing 28. The lever 103 being oscillated from the cam 110 and connected elements, causes the knife-operating lever 99 to impart an oscillatory or shearing movement to the blade 96 which cooperates with the fixed blade 97 to cut off a section 71 of the paper from the roll 72.

When the cutting of the paper occurs, one of the mold recesses 44 is so positioned relative to the cutting knife that the severed paper strip is directed into the mold, and is positioned therein against the face of the plunger head by members 113 and 114 located at the upper end of an oscillating arm 115. At its lower end, the arm 115 is pivoted at 116 on a bracket 117 secured to the casing 28. The arm 115 is provided with a projecting pin 118 (Fig. 4) received in a yoke 119 located at the free end of an arm 120 secured to the lower end of a pivot pin 121 mounted in an extension of the bracket 78. Fixed on the upper end of the pin 121 is an arm 122 having its end pivotally attached to a link 123 connected at 124 to the upper end of a cam lever 125 mounted at 126 and carrying a roll 127 located in the groove 109 of the cam 110.

As a paper lining or sheet 71 is severed it is engaged by the fingers 113 and 114 and inserted in the mold recess 44 then adjacent to the cutters and is placed against the surface of the plunger head located therein. Consequently when each of the molds is brought to position below the hopper for filling, the cheese forced into the mold recess is deposited therein on top of the paper lining 71 previously inserted.

The filled mold recesses are successively brought to a position above the wrapper stack 60 and the cakes of cheese formed in the mold recesses and indicated at 61 are there ejected together with the paper lining 71, as clearly shown at the lower portion of Fig. 3; the cake and lining so ejected being deposited upon the uppermost wrapper of the stack. The ejection of the cakes is effected by lever 128 fixed to the pivot pin 112 and provided at its free end with an adjustable tappet 129 (Fig. 5), which is brought into contact with the end of the stems 62 of the respective plungers to force the plunger head out of the mold to cause it to eject the cake of cheese 61. The lever 128 is oscillated by the pivot pin 112 through the cam lever 107. A bracket 130 formed with an inturned end 131 (Fig. 5) is secured on the lever 128, the inturned end of the bracket contacting with and drawing upwardly on the collar 70 on the upward movement of the lever 128, to aid the springs 68 in drawing the plunger back into the mold to its retracted position after it has ejected the cake of cheese.

To aid in freeing the paper-covered upper face of the cake of cheese from its adherent engagement with the face of the plunger as the plunger deposits the cake on the stack of wrappers, an air blast is used. The air blast may be obtained from any suitable source, not shown, and is delivered through a tube 132 connected to a boss 133, mounted on the casing 28 as shown in Fig. 5. A nipple 134 slidingly mounted in the boss 133 has one of its ends resiliently held by a spring 136 against the face of an annulus 135 secured on the back of the drum 46. Spaced ports 137 are provided in the annulus, and leading from each of these ports is a tube 138 which connects a port 137 with a port 139 provided in each of the bosses 67 and the drum 46. When one of the ports 137 is in registration with the nipple 134 an air blast delivered therethrough will be conveyed through the connected tube 138 to the corresponding port 139. The nipple 134 is so positioned relative to the molds on the drum that the air blast is directed through the boss 67 of the lowermost mold, that is, that mold which is positioned over the wrapper stack and has forced a cake of cheese out of the mold.

When the plunger moves out of the mold, as shown in Fig. 5, the cake of cheese usually falls by gravity upon the uppermost wrapper in the stack. To insure the delivery of the cake of cheese on the wrapper stack and to prevent any possible adherence between the cake 61 and sheet 71 and the face of the plunger, the air blast is exerted through the plunger when it has reached the limit of its downward movement out of the mold.

When the plunger reaches its projected position, by the downward pressure of the lever 128, the transverse port 66 in that plunger stem is brought into registration with the port 139 in the boss 67. The air blast directed through the plunger stem and through the channels 64 in the plunger, acts against the sheet 71 and causes the cake of cheese and the sheet 71 to be deposited, with the paper sheet uppermost, on the top wrapper in the stack 60.

The bosses 67 are also provided with exhaust ports 140 which are so positioned relative to the transverse ports 66 in the plunger stems 62 that when the plungers are in their retracted positions, or are drawn back into the mold recesses, the ports 66 in the plunger stems are in registration with the ports 140 in the bosses, as indicated in the upper portion of Fig. 5. Consequently, when the cheese is forced from the hopper and into the mold then positioned beneath it, the air displaced from that mold by the entry of the cheese therein is exhausted through the connected ports 65, 66 and 140.

The wrappers contained in the stack 60 are made of foil, paper, or other material suitable for the purpose of enclosing and protecting the cheese. These wrappers are larger in size than the cakes of cheese deposited on them so that when a cake of cheese is received upon a wrapper held flatwise in the stack, there are lateral edge portions on the wrapper extending beyond the sides and ends of the cake, these lateral edge portions being later folded about the cake by wrapping means, while the cake and wrapper are transported by conveying means. The stack of wrappers is held between vertical guides 141 and is forced upward by a follower plate 142 having a dependent stem 143 vertically guided in a bracket 144. A lug 145 extending from the bracket, supports a roller 146 which is under the torsional pull of a contained spring, and which tends to draw upward on a strap 147 having one of its ends attached to the peripheral face of the roller 146 and its other end attached to a plate 148 secured to the lower end of the stem 143. By this mechanism the wrappers in the stack 60 are constantly elevated so that the uppermost wrappers therein are held against pins 149 which penetrate through several wrappers in the upper part of the stack. These pins are supported in members 150 secured on a fixed part of the machine frame and positioned to overlie the wrapper stack. The supporting members 150 also carry rolls 151 which rest upon the uppermost wrapper in the stack and from beneath which the wrappers are successively drawn to remove them from the stack.

Two suction pickers are shown at 152, these pickers extending over the wrapper stack in position to engage the uppermost wrapper therein to elevate its forward edge and hold it in position for engagement by grippers 153 and 154 to be carried thereby with a cake of cheese to the conveying and wrapper-folding mechanism. The pickers 152, shown in detail in Fig. 8, are spaced apart and located near opposite edges of the wrapper stack so that a cake of cheese deposited on the top wrapper in the stack will be received between the pickers. Each picker is pivotally mounted at 155 in a bearing 156 on an elongated table 157 which supports the conveying and wrapping mechanism. Each picker is provided with a suction passage 158 extending through its downwardly directed end 160, the lower termination of which is provided with a rubber portion 159. The pickers are each connected to a flexible tube 161, the two tubes being connected to a manifold pipe 162 attached at 163 to the casing 28. The manifold pipe 162 is connected by a tube 164 with a junction 165 in which valves 166 and 167 are located. These valves are operated alternately by a pivoted lever 168 which, when in the position shown in Fig. 2, has opened the valve 167 to atmosphere. The lever 168 when rocked in an opposite direction permits the valve 167 to close and opens the valve 166. The required rocking action is imparted to the lever 168 by means of a push rod 169 which is depressed at the proper time by a cam 170 secured on the shaft 29 and operating upon a roll 171 mounted at the upper end of the push rod 169. A guide 172 directs the rod 169 in its vertical movement. A spring 173 supported on the frame member 174 holds the lever 168 against the lower end of the rod 169 and acts to hold the roll 171 against the face of the cam 170. When suction from a pump or other like means is exerted through the tube 175 leading to the valve 166, and the valve 166 is opened by the pressure of the lever 168 while the valve 167 is closed, the pickers 152 will pneumatically engage the face of the topmost wrapper in the stack. The pickers are elevated, to cause the forward end of wrapper engaged by them to be raised as shown in Fig. 9, by means of sliding members 176 moved beneath inclined lower edges 177 of plates 178 secured to the pickers.

The sliding members 176 are carried by the carriage on which the wrapper grippers 153 and 154 are mounted. This carriage shown in detail in Figs. 5 and 9, and in cross section in Fig. 21, consists generally of an inverted U-shaped frame 179 secured to and carried by longitudinal side bars 180 movable on the table 157 between longitudinal guide rails 181 thereon. Attached to the face of the cross member of the frame 179 are the fixed gripper members 153. The co-operating movable gripper members 154 are pivotally mounted in lugs 182 formed on the ends of rods 183 mounted to rock in the downwardly extending sides of the frame 179. The movable gripper members 154 are guided in forked members 203 located on the sides of the frame 179. An arm 184 is secured on the outer end of each of the shafts 183, the upper end of each of the arms 184 being connected to an adjustable link 185 which connects with the upper end of a lever 186. At their lower ends the two levers 186 are secured on and connected by a shaft 187. One of the arms 186 connects to a link 188 (Figs. 10 and 12) having its opposite end pivotally attached to an arm 189 secured on a pivot pin 190 mounted to rock in a bracket 191. Also secured on the pivot pin 190 is another arm 192 connected by a toggle 193 to a link 194 having its upper end connected by a toggle 195 to the end of a lever 196. This lever 196 is pivoted in an ear 198 formed on the casing 28 and at its free end carries a cam roll 199 located in the cam groove 200 formed in the face of the sprocket 30.

By means of this mechanism, the gripper carriage is reciprocated to and from the wrapper stack. When the carriage is moved toward the stack, the movable gripper members 154 are in a retracted position as indicated in dotted lines in Fig. 5, the rear ends of the movable gripper members 154 being then in contact with the adjustable stops 201 located in the downwardly extended ends 202 of the fixed gripper members 153. When the gripper members 154 so abut against these stops 201, further movement of the lever 186 to the left of Fig. 5 moves the gripper carriage with it. As the carriage moves toward the wrapper stack, the members 176 carried by it are projected beneath the inclined edges 177 on the plates 178 so that the picker members 152 are elevated, as shown in Fig. 9, causing them to raise the edge portion of the uppermost wrapper on which a cake of cheese has been deposited. On the movement of the gripper carriage toward the stack, the ends of the fixed grippers are carried over the face of the elevated portion of the top wrapper. When the gripper carriage reaches its limit of movement toward the wrapper stack, the levers 186 then begin their movement to the right of Fig. 5, and at the beginning of such movement, the movable gripper members 154 are swung with an arcuate movement, first as shown in full lines in Fig. 5, to pass below the elevated portion of the wrapper and thence upwardly to the position shown in Fig. 9, where the elevated part of the wrapper is shown gripped between the fixed and movable gripper members. Suction through the pickers 152 is now discontinued and as further movement of the levers 186 to the right in Fig. 5 continues, the gripper carriage is drawn in that direction, and the wrapper and its cake of cheese are moved away from the stack by the carriage and transported to a position on a conveyor chain 204 by which it is carried to wrapping means acting to fold the wrapper while the wrapper and cake of cheese are being carried by it.

The conveyor chain 204 has its upper stretch operative along one face of the table 157 and is driven with an intermittent movement from the shaft 53 through mechanism to be later described. When the carriage reaches the limit of its movement away from the wrapper stack, it has brought the wrapper and cheese to a position where opposite edge portions of the wrapper rest upon the inclined upper edges 63 (Fig. 5) of a pair of guide plates 205 as shown at the upper portion of Fig. 12 where the wrapper appears in dotted lines. The weight of the cake of cheese holds it on the chain 204 and as the cake is brought to rest on the chain, the edge portions of the wrapper are brought down on the edges of the plates 205 and on the next movement of the chain 204 are directed upwardly thereby. Carrying the wrapper, cake of cheese and lining sheet 71, as shown in dotted lines in Fig. 5, the chain 204 transports them to the right of that figure, moving them between the guide plates 205. The upright portions of these plates 205 converge in the direction of movement of the cheese and wrapper, as shown in Fig. 12, so that these parts fold the edge portions of the wrapper to an upstanding position as shown in Fig. 24 adjacent the longitudinal sides of the cake of cheese. As the wrapper and cake of cheese pass from between the plates 205, they are carried between the inner stretches of two parallel chains 206 and 207, movable in the same direction as the conveyor chain 204, which embrace the longitudinal sides of the cake of cheese and force the longitudinal flaps of the wrapper vertically and against the sides of the cheese. Guide rails 350 serve to hold the chains against the sides of the cake of cheese. The cheese and wrapper, supported on the chain 204 and now held between the chains 206 and 207 are moved below a guide plate 208 which directs the flap of the wrapper indicated at 209 downwardly as shown in Fig. 26. Another guide plate 210 operates to direct the opposite flap 211 of the wrapper downwardly to cause it to overlie the previously folded-down flap 209. Before the second flap 211 is directed downwardly by the action of the guide plate 210, the cake of cheese is carried under the lower stretch of an upper chain 212 overlying the flap 210 and which brings the flap 210 down to its completely folded position so that the second flap 211 can then be easily lapped over it (see Fig. 27). When the second flap 211 emerges from under the guide plate 210, it is carried under the lower stretch of a chain 213 which folds it down on top of the flap 209. When this point is reached, the wrapper is in tubular shape, and the cake and wrapper are embraced on four sides by the chains 204, 206, 207, 212 and 213 as shown in Fig. 29. While the partly wrapped cheese is being transported between these chains, spaced brackets 214 and 215 rising from the upper face of the table 157 carry a guard strip 217 between them which lies between the chains 212 and 213 and prevents the edge portions of the flaps 209 and 211 from rising between the chains 212 and 213 and being damaged by contact or entanglement therewith.

The chains carrying the partly-wrapped cheese bring it to a position beneath a plate 216 where it leaves the embrace of the side chains 206 and 207 and top chains 212 and 213 and is shifted laterally from off the chain 204.

When the partly-wrapped cheese is carried beneath the plate 216 by the chain 204, it is brought up against a stationary abutment plate 253 and is moved from its position on the conveyor chain 204 to another two-part conveyor chain 218 moving at right angles to the direction of movement of the chain 204 and acting to carry the cheese and wrapper while the wrapping operations are completed.

The abutment plate 253 is so located relative to the conveyor chain 204 that a pause in the intermittent movement of the chain 204 occurs just as the end of the wrapper on the partly-wrapped cheese reaches the abutment. Consequently, the contact of the wrapper with the plate 253 is an extremely light one and insufficient to crush or distort the wrapper. By the time that the chain 204 is again moved, the cheese has been moved off it and delivered to the chain 218. Before the partly wrapped cheese is delivered to the chains 218, the ends of the wrapper are partly infolded by the action of fingers 233 carried by a reciprocating slide 219. The slide 219 consists of a plate mounted to reciprocate in guides 220. An arm 221 has one of its ends pivotally attached to the slide, and its other end pivotally attached to a crank arm 222 connected to a pivot pin 223 journalled in a bracket 224. An arm 225 also secured on the pivot pin 223 is connected to a rod 226 leading to an arm 227 (see Fig. 1) pivoted a 228 in the bracket 191. An arm 229 also secured on the pivot 228 is connected by a toggle joint to a link 230 having its upper end connected by a toggle 231 to an arm 232 carrying a cam roller operative in a cam groove formed in the inner face of the sprocket member 30.

The slide 219 carries a pair of wrapper-folding fingers 233 pivoted at 234 in ears 235 located at the opposite longitudinal edges of the slide. At one end these fingers terminate in heads 236 which act to fold a portion of the projecting ends of the wrappers inwardly toward the cake of cheese. At their opposite ends, the fingers are connected by a spring 237 which extends between upstanding ears 238 formed on the fingers. Fixed cams 239 are located on the guides 220, these cams being so positioned that when the slide is in its advanced position and has moved the partly wrapped cheese laterally from off the conveyor chain 204, as shown in Fig. 23, the outwardly bent ends 240 of the fingers 233 are located on the cams so that the heads 236 at the opposite ends of the fingers have forced parts of the end portions of the wrapper close against the ends of the cake of cheese. Before the slide has reached this advanced position shown in Fig. 23, the heads 236 of the fingers 233 have forced the cheese against an abutment in the form of a vertically reciprocated plate 241 which is moved up and down in a guide 243 secured to the upper face of the plate 216 and through a slot 242 formed in the plate 216. When the plate 241 is in its lowered position, as in Figs. 22 and 30, it acts as an abutment for the cake of cheese which is moved against it by the heads 236 on the fingers 233 when these heads first strike against the wrapper near its ends. Since the abutment plate 241 then holds the cake of cheese stationary, the heads 236 force the ends of the wrapper inwardly toward the ends of the cake of cheese, the heads being then brought toward one another by the action of the cams 239 to fold the wrapper ends closely against the ends of the cheese.

The abutment plate 241 is raised and lowered by means of a finger 244 pivoted at 245 on the plate 216, and having its end engaging in a forked member 246 attached to the face of the plate 241. A forked arm 247 is attached to the pivot 245 and a stud 248 projecting from a cam plate 249 engages in the forked arm 247, as shown in Fig. 20. The cam plate 249 has its opposite end pivoted at 250 in ears 251 extending upward from the table 157. A roller 252 carried by the slide 219 is held in constant contact with the upper or cam edge of the plate 249 and at the proper time by its engagement therewith, depresses the plate 249 to cause it, through the medium of the fork 247 and connected finger 244, to raise the abutment plate 241 to move it out of the path of the partly-wrapped cake of cheese which is then moved toward the conveyor chains 218 by the action of the slide 219. The weight of the plate 241 holds the cam roller constantly against the upper or cam edge of the plate 249.

When one of the ends of the wrapper on the partly-wrapped cheese that is carried on the conveyor chain 204 is brought into contact with the fixed abutment plate 253, as shown in Fig. 16, the slide 219 is moved to the right of that figure, bringing the heads 236 of the fingers 233 in contact with the ends of the wrapper, this contact serving to move the cake of cheese up against the plate 241 which is then in its lowered position. The ends 240 of the fingers 233 ride on the cams 239 which move the heads 236 toward one another with an arcuate movement to compress the wrapper ends against the ends of the cheese to fold the flap portions 255 to the position shown in Fig. 20. The movable abutment plate 241 is then elevated and, as movement of the slide 219 to the right of Fig. 23 continues, the parts of the wrapper ends directly opposed to those indicated at 255, are brought against blocks 254 fixed on the table 157. These blocks 254 conform generally in shape to the heads 236 and serve to correspondingly fold the end portions indicated at 256 in Fig. 20 of the wrapper, inwardly. In Fig. 22, the parts of the wrapper which are folded by the heads 236 are indicated at 255 while those parts which are folded by contact with the fixed folders 254 are indicated at 256.

As the cakes of cheese are pushed beyond the folder blocks 254 (the preceding cake being moved by that which follows it, as shown in Figs. 23 and 31) they are received on the conveyor chains 218 and carried thereby in a direction at right angles to their former movement on the first conveyor chain 204. They are also held beneath the lower stretches of a pair of upper chains 257 and have projecting end portions or upper flaps 260 of the wrappers carried beneath a pair of fixed guide plates 258 provided with downwardly inclined lower edges 259 which act to direct these flap portions 260 of the wrappers downwardly toward the ends of the cheese and over the previously folded parts 255 and 256 of the wrapper as shown in Fig. 32. The parts 260 after having been folded down are shown in Fig. 18. As the cakes of cheese pass beyond the guide plates 258, the flap portions 260 are folded inwardly against the ends of the cheese by the pressure of chains 261 and 262 as shown in Fig. 33. When the cakes pass beyond the ends of these chains 261 and 262, the remaining unfolded lower flap portions 263 are brought against the upwardly inclined edges 264 on fixed plates 265 (Figs. 15 and 34) which direct these flaps 263 upwardly toward the ends of the cheese and over the previously folded flap portions 260. Guide plates 266 cooperate with the plates 265 to the extent of holding down the folded flap portions 260 while the lower flap portions 263 are folded over them. After the cakes of cheese pass from between the plates 266 and away from the plates 265, they are received between chains 267 and 268 which fold the flap portions 263 of the wrappers against the ends of the cakes and hold the folded end portions of the wrapper in their proper folded positions until the wrapped cakes emerge from between the chains on the end of the table extension 157a to the extreme right of Fig. 16 where the wrapped cakes are removed for packing or storage.

In order to simplify the description of the machine, the manner in which the chains 204, 206, 207, 212, 213, 218, 257, 261, 262, 267 and 268 are driven was not thus far described. These chains are all driven with an intermittent movement from the shaft 53 which carries a sprocket 269 driving a chain 270 engaged by the idler 271 and driving a sprocket 272 secured at the end of a shaft 273 (see Fig. 10). The shaft 273 is suitably supported in bearings 273a on the machine frame and at its opposite end carries a bevel gear 274 which meshes with and drives a bevel gear 275 secured on the end of a shaft 276 extending at right angles to the shaft 273 and parallel to the table extension 157a. At its opposite end the shaft 276 is provided with a bevel gear 277 driving another bevel gear 278 secured on a shaft 279 carrying a gear 280. The shaft 279 is mounted in bearings 281 located beneath the table portion 157a and carries sprockets 282, shown in Fig. 18, which drive the conveyor chains 218, these chains extending to sprockets 283 mounted on a shaft 284 journalled in bearings 285 located on the under face of the table 157a.

The upper chains 257 are driven by a gear 286 which meshes with the gear 280. Gear 286 is secured on a shaft 287 extending transversely of the table 157a and supported in bearings 288, and carries sprockets 289 around which the upper chains 257 extend. These chains 257 extend to sprockets 290 secured on a shaft 291 journalled in the bearings 292. The chains 267 and 268 extend about the sprockets 293 and 294 respectively. Sprocket 293 is fixed on a stud shaft 295 on which a bevel gear 296 is secured and which is driven by a bevel gear 297 fixed on the shaft 287. Similarly, the sprocket 294 is fixed on a shaft 298 carrying a bevel gear 299 driven by a bevel gear 300 secured on the shaft 287. The chain 267 connects with a sprocket 301 mounted on a stud shaft 302 which projects below the table 157a where it is rotatably supported in a bracket 302a. This stud shaft 302 is provided near its lower end with a sprocket 303 driving a chain 304 connecting with a sprocket 305 fixed on the lower end of a stud shaft 306. The stud shaft 306 carries a sprocket 307 driving the chain 261 which connects with the sprocket 308 fixed on the stud shaft 309. In like manner, the chain 268 extends about the sprocket 310 fixed on the stud shaft 311 held by the bracket 312 beneath the table and carrying the lower sprocket 313, which drives a chain 314 connecting with the sprocket 317 on the shaft 316 and driving the chain 262, which chain connects to a sprocket 318 secured on the stud shaft 319. This completes the means for driving the chains 218, 257, 261, 262, 267 and 268.

The chains 204, 206, 207, 212 and 213 are driven from the transverse shaft 291 which carries a bevel gear 320 driving a like gear 321 secured on a shaft 322 carrying sprockets 323 and 324 which drive the upper chains 212 and 213 respectively. The chain 213 connects to a sprocket 325 supported in a bearing 326, while the chain 212 engages the sprocket 327 supported in the bearing 328. A bevel gear 329 secured on the shaft 322 drives a bevel gear 330 secured on the stud shaft 331 upon which a sprocket 332 is secured, this sprocket engaging and driving the chain 206 which extends to and passes about a sprocket 333. In like manner a bevel gear 334 on the shaft 322 drives a bevel gear 335 secured on the stud shaft 336 which carries a sprocket 337 from which the chain 207 is driven. Chain 207 extends to and engages the sprocket 338. The bottom or conveyor chain 204 is driven from a triple sprocket 339 secured on the shaft 276, this chain extending to and passing around another triple sprocket 340 secured on a shaft 342 mounted in the bearings 341.

The arrangement of the various chains which cooperate in the transportation and wrapping of the cakes of cheese is such that there is a decided working relationship between them resulting in the production of a wrapped cake of cheese of regular shape and smooth wrapping. When the cake of cheese and an accompanying wrapper are received upon the wide, flat face of the first conveyor chain 204 where the cake rests and holds its position by virtue of its own weight, the cake and wrapper are carried by the chain 204 between the guide plates 205 and then under the plates 208 and 210. Before the cake of cheese and its wrapper are carried under the plates 208 and 210, the side chains 206 and 207 fold the longitudinal flaps of the wrapper against the sides of the cake and hold those folded flaps in position. These two chains present broad, flat moving surfaces which hold the cake between them and serve to prevent distortion or crumbling of the cake while acting to first fold and then hold the folded side portions of the wrapper in position. Likewise the chains 212 and 213 operating against the top of the cake, fold down the longitudinal wrapper flaps and hold the top or upper face of the cake in its proper relationship to the other faces of the cake. Consequently, for the greater portion of its travel on the conveyor chain 204, the top, bottom and sides of the cake of cheese are in contact with and held between the flat, moving faces of the chains 204, 206, 207, 212 and 213. These chains, all moving in the same direction and at the same rate of speed constitute a wrapper-folding means as well as a moving, shape-maintaining enclosure for the cake so that while it is being transported, it is firmly, yet flexibly, held and carried and prevented from distortion or breakage.

When the cake is transferred from the chain 204 to the second conveyor chain 218, it is again brought within the embrace of flat, moving chains which fold the ends of the wrapper against the cake and carry the wrapped cake. The maintenance of the moving cake of cheese with four of its faces in contact with the surfaces of broad, flat moving chains holds the cake securely and overcomes the resistance of the various guide plates positioned in the path of travel of the chains and which impart initial folds in the wrapper. The cooperating chains also hold the cake in a constant position on the conveyor and insure the formation of a wrapped cake having uniformity of contour and a smoothly-applied wrapper.

Briefly, the operation of the machine is as follows:

The drum 46 which is rotated intermittently, locates one of the mold recesses 44 in position relative to the paper-cutting knives 96 and 97 each time a pause in the rotative movement of the drum occurs, so that a strip or sheet 71 cut from the paper roll 72 is delivered into the mold recess so located. The arm 115, swung toward the periphery 45 of the drum, directs the paper sheet 71 into the mold recess and positions it against the head of the plunger 59 located therein. The arm 115 is then swung away from the drum and the drum moves the mold recess, within which the paper sheet 71 has been placed, to a position beneath the hopper and in registration with the opening 52 in the block 51, to be filled with cheese. In this way, each of the mold recesses receives a sheet 71 and a filling of cheese. As the drum continues its rotative movement, the filled molds are carried one after another to a position above the wrapper stack 60 where each cake of cheese 60 and the accompanying paper sheet 71 is ejected from a mold recess by the action of the plunger 59 under the pressure of the lever 128, the ejection of the cheese and its separation from the plunger head being insured by the air blast directed through the ports 65 and 66 in the plunger against the sheet 71.

The wrapper pickers 152 raise an edge portion of the wrapper on which the cake of cheese was deposited, as shown in Fig. 9, and this raised portion of the wrapper is grasped by the grippers 153 and 154, and the wrapper and cheese are moved onto conveyor chain 204. The opposite longitudinal side flaps of the wrapper are moved between the convergent plates 205 when the cake of cheese is deposited on the chain 204, these plates causing the sides of the wrapper to be directed upwardly to assume a nearly vertical position. The pressure of the chains 206 and 207 causes the upwardly folded flaps of the wrapper to be folded inwardly against the sides of the cheese. The conveyor chain 204 then moves these vertical parts of the wrapper under the guide plates 208 and 210 which direct the wrapper flaps downwardly, these flaps being then folded downwardly against the top of the cheese by the pressure of the chains 212 and 213. The wrapper is then in tubular shape, the chains 204, 206, 207, 212 and 213 embracing the top, bottom and two sides of the partly-wrapped cheese and holding the wrapper in its folded shape about the cake of cheese while carrying the cheese and maintaining it in shape. By means of the slide 219 and the fingers 233 carried thereby, the partly wrapped cake of cheese is shifted, with a transverse movement, from the chain 204 and the ends of the wrapper are then folded inwardly against the cake of cheese by the action of the heads 236 on the fingers 233. The slide 219 pushes the projecting ends of the wrapper against the fixed folded members 254 which fold the end portions of the wrappers opposite to those folded by the heads 236, against the ends of the cake of cheese. This leaves the wrapper with upper flaps 260 and lower flaps 263 yet to be folded. The cake of cheese now reaches the chain 218 and is transported by it and the chains 257, 261, 262, 267 and 268, and while so carried, the upper flaps 260 on the wrapper are moved under the angular plates 258 which direct these flaps 260 downwardly. The flaps 260 are folded against the ends of the cake by the chains 261 and 262 and held thereby until the cake reaches the second pair of plates 265 which direct the lower flaps 263 upwardly toward the ends of the cake and over the flaps 260. The chains 267 and 268 fold the flaps 263 against the ends of the cake and hold all of the folded end portions of the wrapper in their proper folded relationship until the completely wrapped cakes of cheese are carried beyond the ends of the chains 257, 267 and 268 and out on the face of the table.

The cycle of operations is repeated with rapidity and accuracy, each cake of cheese being smoothly molded and accurately wrapped, neither the cakes nor wrappers therefor being in any way damaged by the wrapping operation. The sheet 71 being located beneath the overlapped flap portions 209 and 211 of the wrapper, serves to prevent the admission of air between these flaps, providing protection for the cake, and oxidation thereof is effectively prevented.

What I claim is:—

1. In a machine of the character described, means for holding a stack of wrappers on which cakes of plastic material are successively deposited, a conveyor, means for successively delivering wrappers from the stack to the conveyor with a cake of the plastic material on each wrapper, means for engaging the lateral edge portions of a wrapper while it is on the conveyor and folding these portions of the wrapper about the cake, a second conveying means receiving the partly wrapped cake from the first conveyor and moving the cake at an angle to the direction of movement of the first conveyor, and means for folding the ends of the wrapper about the cake to complete the wrapping operation while the cake is carried on the second conveying means.

2. In a machine of the character described, means for holding a wrapper stack upon which cakes of plastic material are successively deposited, means for engaging the uppermost wrapper in the stack while a cake is located upon it and shifting the wrapper and cake away from the stack, conveying means to which the wrapper and cake are brought by the wrapper-shifting means, means for folding the opposite side flaps of the wrapper about the cake while the wrapper and cake are moved by the conveying means, and means for receiving the partly wrapped cake from the conveyor and folding the ends of the wrapper about the cake to complete the wrapping operation.

3. In a machine of the character described, means for holding stacked successive wrappers in flatwise position to receive successive cakes of plastic material, means for engaging each wrapper when a cake is located upon it and shifting the wrapper and cake from the stack, conveying means to which the wrapper and cake are brought by the wrapper-shifting means, means movable in company with the conveyor for folding the opposite side flaps of the wrapper about the cake while the wrapper and cake are moved by the conveying means, and means for receiving the partly wrapped cake from the conveyor and folding the ends of the wrapper about the cake to complete the wrapping operation.

4. In a machine of the character described, means for holding a wrapper stack upon which a cake of plastic material and an accompanying paper sheet are successively deposited, means for carrying wrappers and cakes away from the stack, conveying means for receiving and transporting the wrappers and cakes, stationary means for partially folding the wrappers about the cakes, and means movable in company with the conveying means for completing the wrapping of the cakes while the same are being transported by the conveying means.

5. A machine of the character described provided with means for holding a wrapper stack upon which cakes of plastic material and sheets are successively received, means for elevating an edge portion of the uppermost wrapper in the stack while a cake is deposited upon it, means for gripping the elevated portion of the wrapper and carrying the wrapper and accompanying cake away from the stack, a chain conveyor receiving and carrying the cake and wrapper, plates fixed relative to the chain conveyor for directing side portions of the wrapper toward the cake while the wrapper and cake are being carried by the conveyor, moving chains for folding the side portions of the wrapper against the cake, a second chain conveyor, means for shifting the partly wrapped cake from the first chain conveyor to the second chain conveyor, means fixed relative to the second chain conveyor for folding parts of the ends of the wrapper toward the cake, movable folding means for folding other parts of the ends of the wrapper, and chains for completing the folding of the ends of the wrapper and holding the folded ends of the wrapper against the ends of the cake.

6. A machine of the character described provided with means for holding a wrapper stack upon which cakes of plastic material and sheets are successively received, suction means for elevating an edge portion of the uppermost wrapper in the stack with a cake located upon it, means for engaging the elevated portion of the wrapper and drawing the wrapper and accompanying cake away from the stack, a chain conveyor receiving and carrying the cake and wrapper, means fixed relative to the chain for folding lateral edge portions of the wrapper to an upstanding position, a pair of plates for folding down the upstanding wrapper portions toward the top of the cake while the wrapper and cake are being carried by the conveyor, moving chains for folding down the edge portions of the wrapper against the cake, a second chain conveyor, means for shifting the partly-wrapped cake from the first chain conveyor to the second chain conveyor, movable folding means and means fixed relative to the second chain conveyor for folding the opposite ends of the wrapper inwardly toward the ends of the cake, and chains for completing the folding of the ends of the wrapper and holding the folded ends of the wrapper against the ends of the cake.

7. In a machine of the character described, wrapper-supplying means for providing a wrapper for a formed cake, conveyor chains for carrying a cake and its wrapper, and other chains movable in company with the conveyor chains for pressing down partly folded parts of the wrapper about the cake while the cake is carried by the conveyor chains to cause the wrapper to be applied about the cake.

8. In a machine of the character described, wrapper-supplying means for providing a wrapper for a formed cake, a conveyor chain on which the cakes and wrappers are frictionally held, fixed folder members against which parts of the wrapper are carried by the conveyor chain to cause the wrapper to be partly applied about the cake, a second conveyor chain movable at an angle to the first conveyor chain, means for delivering the partly-wrapped cake to the second conveyor chain, and folder means movable with the second conveyor chain for completing the wrapping operation.

9. In a machine of the character described, means for supporting a wrapper flatwise means for depositing a cake of plastic material thereon, a movable conveyor chain on which the cakes are held by their own weight, means for depositing a wrapper and a cake on the conveyor chain, a pair of angular plates between which the wrapper and cake are carried by the conveyor chain to fold lateral edge portions of the wrapper to an upstanding position, a plate under which one of the upstanding edge portions of the wrapper is moved to fold it downward toward the top of the cake, a top chain for folding down the folded portion of the wrapper against the top of the cake, a second folder plate for folding down the other edge portion of the wrapper to cause it to overlie the first downwardly folded portion, a second top chain for folding down the last-mentioned folded portion of the wrapper against the top of the cake, means for shifting the cake and wrapper from the first conveyor chain to a second conveyor chain movable at right angles to the first, fixed plates for folding the ends of the wrapper toward the ends of the cake while the cake is being carried by the second conveyor chain, and chains for folding the end parts of the wrapper against the ends of the cake.

10. In a machine of the character described provided with means for holding a wrapper stack upon which cakes of plastic material and sheets are successively received, means for elevating an edge portion of the uppermost wrapper in the stack while a cake is located upon it, means for gripping the elevated portion of the wrapper and carrying the wrapper and accompanying cake away from the stack, a movable conveyor chain for receiving and carrying the cake and wrapper, a pair of angular plates between which the wrapper and cake are carried by the conveyor chain to fold the lateral edge portions of the wrapper to an upstanding position, a folder plate under which one of the upstanding edge portions of the wrapper is carried by the conveyor chain to fold it downward toward the top of the cake, a top chain for folding down the folded portion of the wrapper against the top of the cake, a second folder plate for folding down the other edge portion of the wrapper to cause it to overlie the first downwardly folded portion, a second top chain for folding down the last-mentioned folded portion of the wrapper against the top of the cake, means for shifting the cake and wrapper from the first conveyor chain to a second conveyor chain movable at an angle to the first, fixed plates for folding the ends of the wrapper toward the ends of the cake while the cake is carried by the second conveyor chain, and chains for completing the folding of the end parts of the wrapper against the cake.

11. In a machine for wrapping cakes of plastic material, a conveyor chain, means for feeding a cake and a wrapper onto the chain to cause the cake and wrapper to retain their position thereon by their own weight, means for folding the wrapper about the cake while the same is frictionally supported on and carried by the chain, said folding means comprising fixed members together with chains moving synchronously with the first chain and overlying the top sides and ends of the cake.

12. In a machine for wrapping cakes of plastic material, a conveyor chain, means for feeding a cake and a wrapper onto the chain, means for partially folding lateral side portions of the wrapper toward the cake while the cake is frictionally supported on the conveyor chain, moving side chains for completing folding the parts of the wrapper against the sides of the cake, means for folding parts of the wrapper down toward top of the cake, moving top chains for completing folding down the parts of the wrapper located on top of the cake, means for partially folding end portions of the wrapper against the ends of the cake, and moving chains for completing the folding of the end parts of the wrapper against the ends of the cake.

13. In a machine for wrapping cakes of plastic material, a movable conveyor chain, means for feeding a cake and a wrapper onto the chain, means for partially folding parts of the wrapper against the cake while the cake is frictionally supported on and carried by the conveyor chain, said folding means including stationary means and chains movable in the same direction as the conveyor chain and overlying the top, sides and ends of the cake to first fold and then hold the folded parts of the wrapper in position about the cake.

14. In a machine for wrapping cakes of plastic material, a conveyor chain, means for feeding a cake and a wrapper onto the chain, means for partially folding opposite sides of the wrapper toward the cake while the cake is supported on the conveyor chain, side chains moved in the same direction as the conveyor chain for pressing the folded side parts of the wrapper against the sides of the cake, means for folding parts of the wrapper down toward the top of the cake, top chains moving parallel to the conveyor chain and in the same direction for pressing down those parts of the wrapper which were folded down toward the top of the cake, means for folding the end portions of the wrapper toward the ends of the cake, and moving chains for pressing the folded end parts of the wrapper against the ends of the cake.

15. In a machine for wrapping cakes of plastic material, a movable flat conveyor for carrying a flat unfolded wrapper bearing a cake, means for folding the wrapper to form it into a tubular shape about the cake while the wrapper and cake are being carried frictionally on the conveyor, a slide movable across the conveyor for shifting the tubularly-formed wrapper and its enclosed cake transversely from the conveyor, a second conveyor on top of which the partly wrapped cake is moved by the slide to a position at right angles to that which it occupied on the first conveyor, means on the slide for folding a part of the ends of the wrapper toward the ends of the cake and means for completing the folding of the ends of the wrapper against the ends of the cake while the cake is being carried on the second conveyor.

16. In a machine for wrapping cakes of plastic material, a movable flat conveyor for carrying a flat wrapper bearing a cake, means for folding the wrapper to form it into a tubular shape while the wrapper is held frictionally on the conveyor, a second conveyor movable at right angles to the direction of movement of the first conveyor, means movable across the first conveyor for shifting the cake and its tubularly-formed wrapper from the first conveyor to a position on the second conveyor at right angles to its former position on the first conveyor, and means for folding the ends of the wrapper while the cake is moved on the second conveyor.

17. In a machine for wrapping cakes of plastic material, a movable conveyor for carrying a wrapper bearing a cake, means for folding the wrapper into tubular form while the cake and wrapper are being carried on the conveyor, chains movable with and in the same direction as the conveyor and overlying the sides and top of the cake carried thereon for first folding and then holding the folded portions of the wrapper against the cake, a sliding member movable across the conveyor for shifting the partly-wrapped cake therefrom, means on said sliding member for engaging parts of the end portions of the wrapper to fold said portions toward the ends of the cake, abutments against which the ends of the wrapper are forced by the sliding means to fold additional portions of the ends of the wrapper toward the ends of the cake, a second conveyor on which the partly-wrapped cake is moved by the action of the sliding means, means for completing the folding of the ends of the wrapper, said means comprising fixed elements together with chains situated relative to the second conveyor to overlie the top and ends of the cake to hold the folded portions of the wrapper in position.

18. In a machine for wrapping cakes of plastic material, a movable chain conveyor for carrying a wrapper bearing a cake, fixed means against which the parts of the wrapper are carried to fold the wrapper into tubular form while the cake and wrapper are being carried on the conveyor, chains movable in the same direction as the conveyor and overlying the sides and top of the cake for first folding and then holding the folded portions of the wrapper against the cake, a sliding member movable across the conveyor for shifting the partly wrapped cake therefrom, a pair of fingers on said sliding member for engaging end portions of the wrapper to fold said portions inwardly toward the ends of the cake, a pair of fixed abutments against which other portions of the ends of the wrapper are forced by the sliding means to fold said other portions of the ends of the wrapper inwardly toward the ends of the cake, a second conveyor movable at an angle to the first on which the partly wrapped cake is deposited by the action of the sliding means, fixed folder plates for folding parts of the ends of the wrapper toward the ends of the cake, and chains positioned relative to the second conveyor to overlie the top and ends of the cake, the chains located relative to the ends of the cake first folding and then holding the end portions of the wrapper against the ends of the cake.

19. In a machine for wrapping cakes of plastic material, a conveyor for carrying a wrapper bearing a cake, means for folding the wrapper into tubular form about the cake while the cake and wrapper are on the conveyor, a second conveyor movable at an angle to the first conveyor, a movable member for shifting the tubular wrapper and cake from the first conveyor on to the second conveyor, said member having means for folding parts of the wrapper towards the unenclosed parts of the cake.

20. In a machine for wrapping cakes of plastic material, a conveyor for carrying a cake supported on a wrapper, means for folding the wrapper into tubular form about the cake, a second conveyor, a movable member for shifting the wrapper and cake from the first conveyor onto the second conveyor, said member being provided with fingers for engaging parts of the ends of the wrapper to fold said parts inwardly towards the ends of the cake.

21. In a machine for wrapping cakes of plastic material, a conveyor for carrying a cake supported on a wrapper, means for folding the wrapper into tubular form about the cake, a second conveyor, a movable member for sliding the partly wrapped cake from the first conveyor onto the second conveyor, and means on said movable member for folding parts of the ends of the wrapper against the ends of the cake during movement of the cake from one conveyor to the other.

22. In a machine for wrapping cakes of plastic material, a conveyor for carrying a cake supported on a wrapper, means for folding the wrapper into tubular form about the cake while the cake is on the conveyor, a second conveyor, a slide movable transversely across the first conveyor to shift a partly wrapped cake therefrom to a position on the second conveyor, a pair of fingers on said slide for engaging end portions of the wrapper to fold said portions toward the ends of the cake, and means for moving said fingers toward one another during movement of the slide toward the second conveyor.

23. In a machine of the character described, a conveyor chain for carrying a cake supported on a wrapper, fixed folding plates at the sides of the conveyor chain for partly folding parts of the wrapper against the cake, and chains located at the sides of the conveyor chain and moving in company with the conveyor chain for completing the partial folding of the wrapper.

JOHN M. McCLATCHIE.